Jan. 11, 1966  R. C. HARRINGTON, JR., ET AL  3,229,008
PROCESS FOR PRODUCING A POLYPROPYLENE FIBROUS
PRODUCT BONDED WITH POLYETHYLENE
Filed Dec. 5, 1961
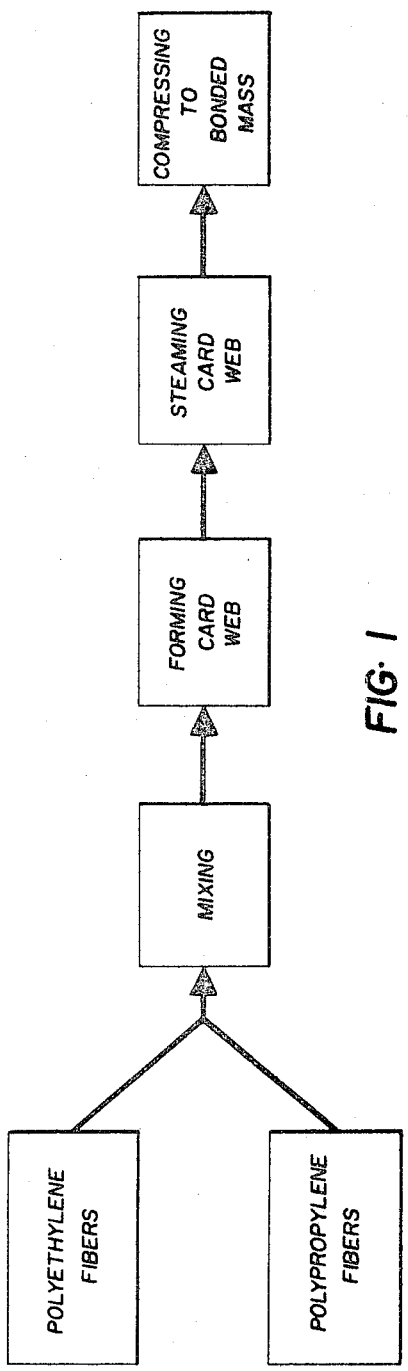
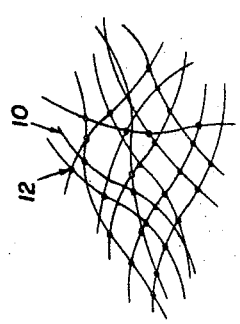
ROBERT C. HARRINGTON, JR.
JAMES L. SMITH
JAMES H. BOND
INVENTORS
BY
ATTORNEYS

United States Patent Office 3,229,008
Patented Jan. 11, 1966

3,229,008
PROCESS FOR PRODUCING A POLYPROPYLENE FIBROUS PRODUCT BONDED WITH POLYETHYLENE
Robert C. Harrington, Jr., James L. Smith, and James H. Bond, Kingsport, Tenn., assignors to Eastman Kodak Company, Rochester, N.Y., a corporation of New Jersey
Filed Dec. 5, 1961, Ser. No. 157,212
2 Claims. (Cl. 264—122)

This invention relates to a non-woven fabric. More particularly, it concerns a process for producing a polypropylene non-woven fabric bonded by polyethylene.

This invention is a continuation-in-part of our application Serial No. 54,929 filed September 9, 1960 now Patent No. 3,110,642. In our aforesaid earlier application there has been described a process for converting fibro-plastic material substantially directly into fibrous materials such as non-woven fabrics, cable stuffing, cigarette filters and the like. The fibrous material is prepared by applying a stream of inert gas or steam propelled substantially at right angles to the extruded polymer melt or solution thereby attenuating the melt or solution into the form of fibers which are collected in a direction substantially countercurrent to that of the propellent stream. Once an initial collecting point is provided, these fibers adhere in the form of tow which can be packaged in any suitable manner. This tow or fibrous material may be blended with certain other fibers in non-woven fabrics. However, because of the similarity of the relatively low melting points of both polypropylene and polyethylene and the similarity of many other chemical and physical properties of each it has heretofore been unknown how to form a polypropylene non-woven fabric bonded with polyethylene as thus formed or by any other polyethylene. It is known that polyolefins in granular form may be used to cause bonding of dissimilar sheet materials by the application of heat, for example laminated rayon non-woven material bonded with polyethylene granules as disclosed in U.S. Patent 2,992,149. Nevertheless, to the best of our knowledge no method has as yet been devised whereby polypropylene tow may be formed into bonded non-woven fabric by using polyethylene as a bonding medium. Accordingly, it is believed apparent that the development of a polypropylene non-woven fabric bonded by polyethylene represents a highly desirable result.

It is an object of this invention, therefore, to produce a novel polypropylene non-woven fabric bonded by polyethylene. A further object is to disclose a simple and economical method of bonding polypropylene in the form of a non-woven fabric by the use of polyethylene as the bonding material. A still further object is to produce a non-woven fabric suitable for use in innerliners and inert filters. Other objects will appear hereinafter.

We have found that a non-woven material containing polypropylene can be bonded with a polyethylene fiber binder. The bonding may be accomplished by the use of polyethylene fibers which have a low melt viscosity at elevated temperatures. An important characteristic of these polyethylene binder fibers is that they have a viscosity in the neighborhood of 8000 centipoises at 20° C. above their accepted flow points. By their accepted flow points we mean their ASTM D36–26 ring and ball softening points. While we do not wish to be bound by any particular theory as to why this characteristic causes the desired bonding, it appears that this viscosity is necessary in order to have the polyethylene flow to the intersects of the polypropylene fiber and form bonds at these intersects. Any form of polyethylene fibers can be used provided they have this characteristic viscosity. For example, standard high density or low density polyethylene fibers may be use or a similar degraded polyethylene. We have found especially useful polyethylene fibers having a melting point in the neighborhood of 100° C., for example, Eastman's Epolene C, a low-molecular weight polyethylene resin, or a similar degraded polyethylene having a melting point close to 160° C. The denier per filament may vary from 1.5–200, although the preferred range is from about 2 to about 16. Mixtures of such fibers may be used to obtain any desired intermediate melting point, provided the characteristic low melt viscosity at elevated temperatures is exhibited. The polypropylene which may be bonded with polyethylene fibers in accordance with our invention may be either high-density or low-density polypropylene or blends of various polypropylenes, oriented and unoriented polypropylene, polypropylene resins or degraded polypropylene. The denier per filament may be from 1.5 to 200, although better bonding is generally achieved at a denier per filament of from about 2 to about 16.

The polyethylene fiber-bonded polypropylene non-woven fabric of this invention may be formed by blending batts of polypropylene and polyethylene on a card or other conventional equipment for producing non-woven material followed by subjection to heat with or without pressure. By this method a coherent, well-bonded mass of polypropylene fibers having high strength in all directions is formed. An important advantage of such batts is that their density can be varied from a low to a very high figure, for example, from about 1 oz./sq. yd. (½" thick) to about 4 oz./sq. yd. (½" thick). The variation in density to the desired amount may be accomplished simply by varying the degree of compression during the bonding operation.

A further understanding of our invention may be had by reference to the drawing of which:

FIG. 1 is a schematic diagram in flow sheet form illustrating the method of this invention for making a polypropylene non-woven product bonded with polyethylene.

FIG. 2 is a schematic surface representation drawn to an enlarged scale of the non-woven fabric of this invention showing in detail the bonding of the polypropylene fibers at their intersects by the polyethylene.

In FIG. 2, which is a schematic representation of the polypropylene fibers of this invention bonded by polyethylene, a fibrous web of bonded polypropylene fibers consisting of a pluarality of randomly arranged polypropylene fibers 10 and a plurality of polyethylene bonds 12 at various intersects of said polypropylene fibers.

The following examples are illustrative of our invention.

*Example I*

60% by weight of 5 d./f., 2" polypropylene fibers were mixed with 40% by weight of fibers from Epolene C resin (M.P. about 100° C.) having a denier per filament range from 2 to 10 and cut 1½". This blend was formed into a card web having a weight of 1 oz./sq. yd. (½" thick). Hot air (130° C.) was blown through the batt for 5 minutes, after which it was allowed to cool. Microscopic examination showed the polypropylene to be bonded at many of the intersects and a very strong light, foraminous structure was produced. FIG. 2 shows the type of bonding produced.

*Example II*

60% by weight of 5 d./f., 2" polypropylene fibers were mixed with 40% by weight of Epolene C of the type described in Example I. This mixture was carded, and the resultant card web bonded by heating with 60 lb. steam under moderate pressure for 1 minute in a Hoffman press. The resulting batt was moderately dense and had good strength in all directions.

*Example III*

80% by weight of 5 d./f., 2" polypropylene fibers were mixed with 20% by weight of Epolene C as described in Example I, and formed into a card web. This web was then bonded under light pressure and heated from 60 lb. steam for 1 minute in a Hoffman press. The resulting batt was well bonded, had good strength in all directions, and weighed about 1 oz./sq. yd. (½" thick). This batt was used in innerliners to give good insulation.

*Example IV*

A batt was made from 60% polypropylene fibers and 40% of a binder fiber prepared from a polyethylene wax having a melting point of 120° C. The batt was prepared in the manner as described in Example I except that bonding was accomplished at 140° C. The resulting non-woven structure was of medium density, had good strength in all directions, and was able to withstand temperatures of 100° C. without mechanical deterioration.

*Example V*

Another blend was prepared using 70% by weight of 5 d./f., 2" polypropylene fibers and 30% by weight of fibers of a polyethylene wax having a melting point of 120° C. This web was calendered under 2000 lbs. pressure at 130° C. to produce a dense, strong polypropylene structure. It was used in battery separator plates with excellent solvent resistance.

*Example VI*

Polyethylene having a specific gravity of 0.907 and a viscosity at 300° F. of approximately 9000 centipoises was extruded into a 32-oz. propellent stream directed at right angles thereto and the filaments formed by said propellent stream were collected as fibrous tow moving substantially countercurrently to the direction of said propellent stream. The fibrous tow contained filaments of a variable denier per filament of 4–20. A batt was prepared by blending 60% by weight of 8 d./f., 2" polypropylene fibers with 40% by weight of the polyethylene tow. This blend was formed into a card web having a weight of 5 oz./sq. yd. (1" thick). Hot air (130° C.) was blown through the batt for 5 minutes after which it was allowed to cool. Microscopic examination showed that the polypropylene non-woven fabric was bonded at many of the filament intersects into a strong, light, foraminous structure.

The staple length of the polypropylene which may be bonded with polyethylene fibers in accordance with our invention may be varied, for example from 1–10 inches. The polyethylene fibers used as the bonding medium may be produced by conventional melt extrusion techniques as well as the method of our co-pending application Serial No. 54,929 now Patent No. 3,110,642. The polyolefins referred to above and the polyolefins used in the above examples are commercially available. They may be prepared, for example, as disclosed in our co-worker's patent U.S. 2,835,659.

Although the invention has been described in considerable detail with particular reference to certain preferred embodiments thereof, variations and modifications can be effected within the spirit and scope of the invention as described hereinabove, and as defined in the appended claims.

We claim:

1. A process for the production of a polypropylene fibrous product bonded at the intersects of the polypropylene fibers thereof with polyethylene comprising.

(1) mixing low molecular weight polyethylene fibers having a low viscosity at elevated temperatures in the neighborhood of 8,000 centipoises at 20° C. above their ASTM D36-26 ring and ball softening points, a melting point close to 160° C. and a denier per filament of 2 to 10 with polypropylene fiber having a denier per filament of 2 to 16, a staple length of 1 to 10 inches and a melting point higher than the melting point of said polyethylene fiber to make a blend containing from 60 to 80 percent by weight polypropylene fibers, balance polyethylene fibers, (2) forming the blend obtained by said mixing into a card web, (3) subjecting said card web to steam under moderate pressure for about 1 to 5 minutes, (4) melting the polyethylene fibers, (5) flowing the melted polyethylene to the intersects of the polypropylene fibers, (6) bonding the polypropylene fibers at the intersects with the melted polyethylene, (7) removing the card web from subjection to the steam to complete the bonding of the polypropylene by polyethylene at the intersects, (8) and compressing sufficiently during the bonding operation to produce a coherent, well bonded mass of polypropylene fibers having a high strength in all directions, a density of 1 ounce per square yard to 4 ounces per square yard at ½-inch thickness the polypropylene fibers in said well bonded mass being arranged in a random distribution with bonds clearly shown at a large number of their intersect upon microscopic examination while retaining their identity as individual fibers.

2. A process for the production of a polypropylene fibrous product bonded at the intersects of the polypropylene fibers thereof with polyethylene comprising blending as a bonding medium attenuated adhering polyethylene fibers of a denier per filament of from about 2–10, a viscosity in the neighborhood of 8,000 centipoises a 20° C. above their accepted flow points, and a melting point below about 160° C. in the manner of a card web with polypropylene fibers of a denier per filament of about 2 to 16 into a batt of polypropylene fibers containing about 20 to 40% by weight polyethylene fibers, subjecting the resulting batt for a few minutes under pressure to vaporous fluid which is not a solvent for polyethylene and polypropylene at a temperature in sufficient to melt the polypropylene fibers but sufficient to melt the polyethylene fibers and cause them to flow to a substantial number of intersects of the polypropylene fibers thereby bonding said polypropylene fibers at said intersects, and withdrawing the resulting mass from subjecting to said fluid under pressure thereby completing formation of a coherent, well bonded reticulated wet mass of randomly distributed polypropylene fibers having high strength in all directions.

References Cited by the Examiner

UNITED STATES PATENTS

| | | | |
|---|---|---|---|
| 2,253,000 | 8/1941 | Francis | 264—122 XR |
| 2,336,797 | 12/1943 | Maxwell | 264—122 XR |
| 2,417,453 | 3/1947 | Wade | 28—7 |
| 2,459,804 | 1/1949 | Francis | 264—122 XR |
| 2,620,853 | 12/1952 | Boese | 28—7 |
| 2,676,128 | 4/1954 | Piccard | 131—208 XR |
| 2,820,716 | 1/1958 | Harmon et al. | 19—161 |
| 2,900,700 | 8/1959 | Frickert | 28—7 |
| 2,916,038 | 12/1959 | Wade | 131—208 |
| 2,959,838 | 11/1960 | MacHenry | 28—78 |
| 3,016,599 | 1/1962 | Perry | 28—78 |
| 3,079,930 | 3/1963 | Cobb et al. | 131—208 |
| 3,110,642 | 11/1963 | Harrington et al. | 264—6 |
| 3,144,025 | 8/1964 | Erlich | 131—208 |

ALEXANDER H. BRODMERKEL, *Primary Examiner*

RUSSELL C. MADER, *Examiner.*